United States Patent
Hamakubo et al.

(10) Patent No.: US 12,054,629 B2
(45) Date of Patent: Aug. 6, 2024

(54) RESIN COMPOSITION, OPTICAL FIBER, AND METHOD FOR MANUFACTURING OPTICAL FIBER

(71) Applicant: SUMITOMO ELECTRIC INDUSTRIES, LTD., Osaka (JP)

(72) Inventors: Katsushi Hamakubo, Osaka (JP); Kazuyuki Sohma, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 781 days.

(21) Appl. No.: 17/269,746

(22) PCT Filed: Apr. 30, 2020

(86) PCT No.: PCT/JP2020/018347
§ 371 (c)(1),
(2) Date: Feb. 19, 2021

(87) PCT Pub. No.: WO2020/250594
PCT Pub. Date: Dec. 17, 2020

(65) Prior Publication Data
US 2021/0198517 A1    Jul. 1, 2021

(30) Foreign Application Priority Data
Jun. 14, 2019  (JP) ................. 2019-110920

(51) Int. Cl.
*C03C 25/47*    (2018.01)
*C03C 25/1065*  (2018.01)
(Continued)

(52) U.S. Cl.
CPC ........ *C09D 151/08* (2013.01); *C03C 25/1065* (2013.01); *C03C 25/285* (2013.01);
(Continued)

(58) Field of Classification Search
CPC ...................................................... C03C 25/47
(Continued)

(56) References Cited

U.S. PATENT DOCUMENTS 6,579,914 B1 * 6/2003 Gantt .................. C08G 59/68
522/143
2009/0140284 A1 * 6/2009 Kurino ................ C08G 83/001
257/E23.116
(Continued)

FOREIGN PATENT DOCUMENTS

CN    105372752 A    3/2016
CN    107163902 A    9/2017
(Continued)

OTHER PUBLICATIONS

Shiue, J. et al., "Effects of silica nanoparticle addition to the secondary coating of dual-coated optical fibers," Acta Materialia, Mar. 30, 2006, vol. 54, p. 2631-p. 2636.

*Primary Examiner* — Kaveh C Kianni
(74) *Attorney, Agent, or Firm* — Faegre Drinker Biddle & Reath LLP

(57) ABSTRACT

A resin composition for coating an optical fiber comprises a base resin containing an oligomer, a monomer, and a photopolymerization initiator, and hydrophobic inorganic oxide particles, wherein the oligomer comprises urethane (meth) acrylate and epoxy (meth)acrylate, and the mass ratio of the content of urethane (meth)acrylate to the content of epoxy (meth)acrylate is 0.25 or more.

7 Claims, 1 Drawing Sheet

(51) Int. Cl.
  *C03C 25/285* (2018.01)
  *C03C 25/6226* (2018.01)
  *C08F 290/06* (2006.01)
  *C09D 151/08* (2006.01)
  *G02B 6/02* (2006.01)

(52) U.S. Cl.
  CPC .......... *C03C 25/47* (2018.01); *C03C 25/6226* (2013.01); *C08F 290/067* (2013.01); *G02B 6/02395* (2013.01)

(58) Field of Classification Search
  USPC .......................................................... 385/123
  See application file for complete search history.

(56) References Cited

U.S. PATENT DOCUMENTS

| | | | | |
|---|---|---|---|---|
| 2010/0330475 | A1* | 12/2010 | Tamoto | G03G 5/0732 |
| | | | | 399/346 |
| 2012/0321265 | A1 | 12/2012 | Terruzzi et al. | |
| 2016/0047977 | A1 | 2/2016 | Sohma et al. | |
| 2016/0177100 | A1* | 6/2016 | Mochizuki | C07D 471/04 |
| | | | | 428/195.1 |
| 2016/0306109 | A1 | 10/2016 | Iwaguchi et al. | |
| 2017/0242187 | A1* | 8/2017 | Iwaguchi | G02B 6/4403 |
| 2018/0156996 | A1* | 6/2018 | Iwaguchi | B32B 5/26 |
| 2020/0216714 | A1 | 7/2020 | Hamakubo et al. | |
| 2021/0026065 | A1 | 1/2021 | Hamakubo et al. | |
| 2021/0181410 | A1 | 6/2021 | Hamakubo et al. | |
| 2021/0181411 | A1* | 6/2021 | Iwaguchi | C03C 25/48 |
| 2021/0188705 | A1 | 6/2021 | Hamakubo | |

FOREIGN PATENT DOCUMENTS

| | | |
|---|---|---|
| JP | H8-217495 A | 8/1996 |
| JP | 2006-161030 A | 6/2006 |
| JP | 2006-524737 A | 11/2006 |
| JP | 2009-510520 A | 3/2009 |
| JP | 2010-511770 A | 4/2010 |
| JP | 2015-089865 A | 5/2015 |
| WO | WO-2004/080907 A1 | 9/2004 |
| WO | WO-2007/040947 A1 | 4/2007 |
| WO | WO-2008/069656 A1 | 6/2008 |
| WO | WO-2017/065274 A1 | 4/2017 |
| WO | WO-2019/116967 A1 | 6/2019 |
| WO | WO-2019/194198 A1 | 10/2019 |
| WO | WO-2019/203236 A1 | 10/2019 |
| WO | WO-2020/040223 A1 | 2/2020 |

* cited by examiner

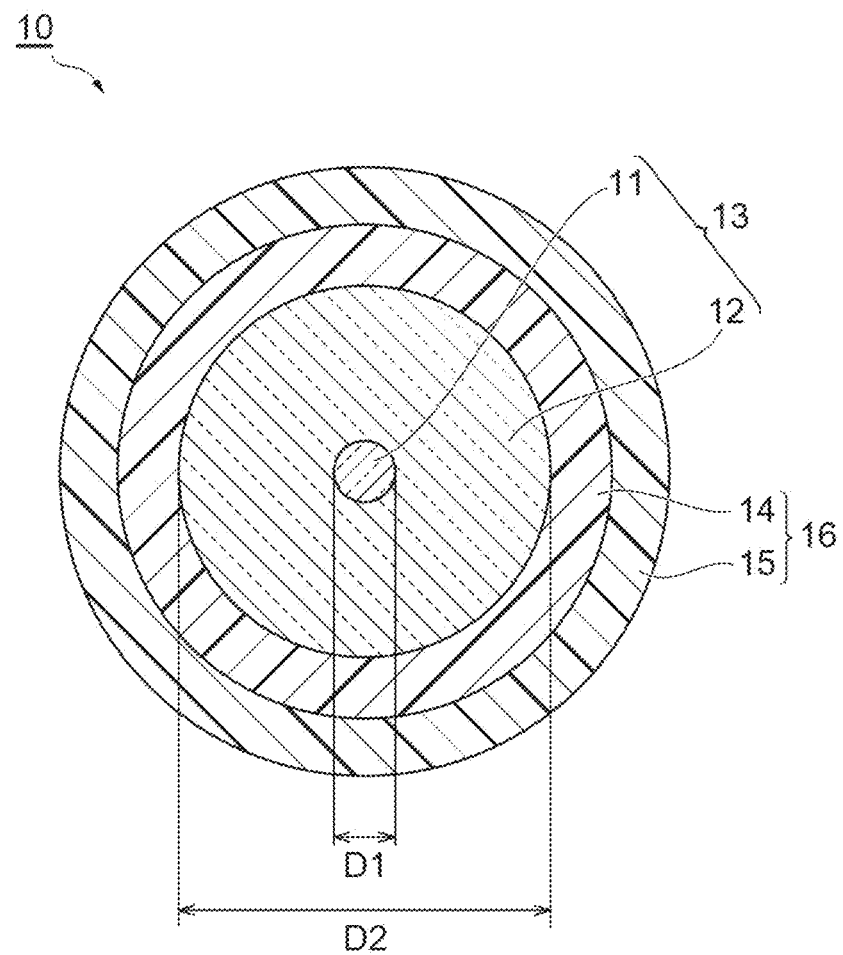

RESIN COMPOSITION, OPTICAL FIBER, AND METHOD FOR MANUFACTURING OPTICAL FIBER

TECHNICAL FIELD

The present disclosure relates to a resin composition, an optical fiber, and a method for manufacturing an optical fiber.

This application claims priority based on Japanese Patent Application No. 2019-110920 filed on Jun. 14, 2019, and incorporates all the contents described in the Japanese application.

BACKGROUND ART

An optical fiber has generally a coating resin layer for protecting a glass fiber that is an optical transmission medium. The coating resin layer generally comprises a primary resin layer and a secondary resin layer. In order to reduce an increase in transmission loss induced by microbend generated when lateral pressure is applied to the optical fiber, the optical fiber has been required to have excellent lateral pressure characteristics.

For example, in Patent Literature 1, it is investigated to reduce the bending loss of the optical fiber by increasing the Young's modulus of the secondary resin layer (second coating).

CITATION LIST

Patent Literature

[Patent Literature 1] JP 2009-510520 A

SUMMARY OF INVENTION

A resin composition according to an aspect of the present disclosure comprises a base resin containing an oligomer, a monomer, and a photopolymerization initiator, and hydrophobic inorganic oxide particles, wherein the oligomer comprises urethane (meth)acrylate and epoxy (meth)acrylate, and the mass ratio of the content of urethane (meth)acrylate to the content of epoxy (meth)acrylate is 0.25 or more.

BRIEF DESCRIPTION OF DRAWING

FIG. 1 is a schematic cross-section diagram showing an example of the optical fiber according to the present embodiment.

DESCRIPTION OF EMBODIMENTS

Problem to be Solved by the Present Disclosure

In order to increase the production efficiency of an optical fiber having lateral pressure resistance characteristics, it is necessary to increase the speed (linear speed) of drawing the optical fiber. However, the degree of the heat of reaction of the resin composition used in forming the secondary resin layer is large, increasing the residual stress applied to the primary resin layer, and thus easily generating voids in the optical fiber. In addition, when the linear speed is increased, the optical fiber is wound while the coating resin layer is at a high temperature, and as a result, the secondary resin layer is deformed and the yield tends to decrease.

An object of the present disclosure is to provide: a resin composition capable of efficiently producing an optical fiber having excellent lateral pressure resistance characteristics; and an optical fiber comprising a secondary resin layer formed from the resin composition.

Effect of the Present Disclosure

The present disclosure can provide: a resin composition capable of efficiently producing an optical fiber having excellent lateral pressure resistance characteristics; and an optical fiber comprising the secondary resin layer formed from the resin composition.

DESCRIPTION OF EMBODIMENTS OF THE PRESENT DISCLOSURE

First, the contents of the embodiment of the present disclosure will be described by listing them. A resin composition according to an aspect of the present disclosure comprises a base resin containing an oligomer, a monomer, and a photopolymerization initiator, and hydrophobic inorganic oxide particles, wherein the oligomer comprises urethane (meth)acrylate and epoxy (meth)acrylate, and the mass ratio of the content of urethane (meth)acrylate to the content of epoxy (meth)acrylate is 0.25 or more.

Such a resin composition can reduce the heat of reaction in curing. An optical fiber having excellent lateral pressure resistance characteristics can be efficiently produced by using the above resin composition as an ultraviolet curable resin composition for coating the optical fiber.

Due to suppression of the generation of voids when the linear speed is increased to produce an optical fiber, the amount of heat of reaction when the above resin composition is irradiated with ultraviolet rays at an irradiation intensity of 30 mW/cm$^2$ for 300 seconds may be 100 J/g or more and 275 J/g or less.

Due to easy formation of a secondary resin layer with a high Young's modulus, the above monomer may comprise a multifunctional monomer having two or more polymerizable groups.

Due to excellent dispersion properties in the resin composition and easy adjustment of Young's modulus, the inorganic oxide particles may be particles including at least one selected from the group consisting of silicon dioxide, zirconium dioxide, aluminum oxide, magnesium oxide, titanium oxide, tin oxide, and zinc oxide. Due to easier adjustment of the heat of reaction and Young's modulus, the content of the inorganic oxide particles may be 1% by mass or more and 60% by mass or less based on the total amount of the oligomer, monomer, and inorganic oxide particles.

The optical fiber according to an aspect of the present disclosure comprises a glass fiber comprising a core and a cladding, a primary resin layer being in contact with the glass fiber and covering the glass fiber, and a secondary resin layer covering the primary resin layer, wherein the secondary resin layer comprises a cured product of the above resin composition. Accordingly, the lateral pressure characteristics of the optical fiber can be improved. Due to easy improvement in the lateral pressure characteristics of the optical fiber, the Young's modulus of the secondary resin layer may be 1200 MPa or more and 3500 MPa or less at 23° C.

A method for manufacturing the optical fiber according to an aspect of the present disclosure comprises: an application step of applying the above resin composition to the outer periphery of a glass fiber composed of a core and a cladding;

and a curing step of curing the resin composition by irradiating with ultraviolet rays after the application step. This can efficiently produce an optical fiber having excellent lateral pressure resistance characteristics.

Detail of Embodiment of the Present Disclosure

Specific examples of a resin composition and an optical fiber according to the present embodiments will be described referring to the drawing as necessary. The present invention is not limited to these illustrations but is indicated by the claims and intended to include meanings equivalent to the claims and all modifications within the claims. In the following description, the same reference numerals are given to the same elements in the description of the drawing, and redundant explanations are omitted.

Resin Composition

The resin composition according to the present embodiment comprises a base resin containing an oligomer, a monomer, and a photopolymerization initiator, and hydrophobic inorganic oxide particles.

(Base Resin)

The oligomer according to the present embodiment comprises urethane (meth)acrylate and epoxy (meth)acrylate. The mass ratio (UA/EA) of the content of urethane (meth)acrylate (UA) to the content of epoxy (meth)acrylate (EA) is 0.25 or more. From the viewpoint of reducing the heat of reaction of the resin composition, the UA/EA is preferably 0.45 or more, more preferably 0.5 or more, and further preferably 0.7 or more. The upper limit of the UA/EA may be 5.0 or less, 4.0 or less, or 3.5 or less.

As urethane (meth)acrylate, an oligomer obtained by reacting a polyol compound, a polyisocyanate compound, and a hydroxyl group-containing (meth)acrylate compound can be used. (Meth)acrylate means an acrylate or a methacrylate corresponding to it. The same applies to (meth) acrylic acid.

Examples of the polyol compound include polytetramethylene glycol, polypropylene glycol and bisphenol A-ethylene oxide addition diol. Examples of the polyisocyanate compound includes 2,4-tolylene diisocyanate, 2,6-tolylene diisocyanate, isophorone diisocyanate, and dicyclohexylmethane 4,4'-diisocyanate. Examples of the hydroxyl group-containing (meth)acrylate compound include 2-hydroxyethyl (meth)acrylate, 2-hydroxybutyl (meth)acrylate, 1,6-hexanediol mono(meth)acrylate, pentaerythritol tri(meth)acrylate, 2-hydroxypropyl (meth)acrylate, and tripropylene glycol mono(meth)acrylate.

From the viewpoint of adjusting the Young's modulus of the resin layer, the number average molecular weight (Mn) of the polyol compound is preferably 300 or more and 3000 or less, more preferably 400 or more and 2500 or less, and further preferably 500 or more and 2000 or less.

As a catalyst for synthesizing urethane (meth)acrylate, an organotin compound is generally used. Examples of the organotin compound include dibutyltin dilaurate, dibutyltin diacetate, dibutyltin maleate, dibutyltin bis(2-ethylhexyl mercaptoacetate), dibutyltin bis(isooctyl mercaptoacetate), and dibutyltin oxide. From the viewpoint of easy availability or catalyst performance, it is preferable that dibutyltin dilaurate or dibutyltin diacetate be used as catalyst.

When urethane (meth)acrylate is synthesized, lower alcohols having 5 or less carbon atoms may be used. Examples of the lower alcohols include methanol, ethanol, 1-propanol, 2-propanol, 1-butanol, 2-butanol, 2-methyl-2-propanol, 1-pentanol, 2-pentanol, 3-pentanol, 2-methyl-1-butanol, 3-methyl-1-butanol, 2-methyl-2-butanol, 3-methyl-2-butanol, and 2,2-dimethyl-1-propanol.

The oligomer obtained by reacting a compound having a (meth)acryloyl group with an epoxy resin having two or more glycidyl groups can be used as an epoxy (meth) acrylate.

At least one selected from the group consisting of the monofunctional monomer having one polymerizable group and the multifunctional monomer having two or more polymerizable groups can be used as the monomer. A monomer may be used by mixing two or more monomers.

Examples of the monofunctional monomer include (meth)acrylate monomers such as methyl (meth)acrylate, ethyl (meth)acrylate, propyl (meth)acrylate, n-butyl (meth)acrylate, sec-butyl (meth)acrylate, tert-butyl (meth)acrylate, isobutyl (meth)acrylate, n-pentyl (meth)acrylate, isopentyl (meth)acrylate, hexyl (meth)acrylate, heptyl (meth)acrylate, isoamyl (meth)acrylate, 2-ethylhexyl (meth)acrylate, n-octyl (meth)acrylate, isooctyl (meth)acrylate, isodecyl (meth)acrylate, lauryl (meth)acrylate, 2-phenoxyethyl (meth)acrylate, 3-phenoxybenzyl acrylate, phenoxydiethylene glycol acrylate, phenoxypolyethylene glycol acrylate, 4-tert-butylcyclohexanol acrylate, tetrahydrofurfuryl (meth)acrylate, benzyl (meth)acrylate, dicyclopentenyl (meth)acrylate, dicyclopentenyloxyethyl (meth)acrylate, dicyclopentanyl (meth)acrylate, nonylphenol polyethylene glycol (meth) acrylate, nonylphenoxypolyethylene glycol (meth)acrylate, and isobornyl (meth)acrylate; carboxyl group containing monomers such as (meth)acrylic acid, (meth)acrylic acid dimer, carboxyethyl (meth)acrylate, carboxypentyl (meth) acrylate, and ω-carboxy-polycaprolactone (meth)acrylate; heterocycle containing monomers such as N-(meth)acryloyl morpholine, N-vinyl pyrrolidone, N-vinyl caprolactam, N-acryloylpiperidine, N-methacryloylpiperidine, N-(meth)acryloylpyrrolidine, 3-(3-pyridine) propyl (meth)acrylate, and cyclic trimethylolpropane formal acrylate; maleimide monomers such as maleimide, N-cyclohexyl maleimide, and N-phenyl maleimide; amide monomers such as (meth)acrylamide, N, N-dimethyl (meth)acrylamide, N, N-diethyl (meth)acrylamide, N-hexyl (meth)acrylamide, N-methyl (meth)acrylamide, N-butyl (meth)acrylamide, N-butyl (meth)acrylamide, N-methylol (meth)acrylamide, and N-methylolpropane (meth)acrylamide; aminoalkyl (meth) acrylate monomers such as aminoethyl (meth)acrylate, aminopropyl (meth)acrylate, N, N-dimethylaminoethyl (meth) acrylate, and tert-butylaminoethyl (meth)acrylate; and succinimnide monomers such as N-(meth)acryloyloxymethylene succinimide, N-(meth)acryloyl-6-oxyhexamethylene succinimnide, and N-(meth)acryloyl-8-oxyoctamethylene succinimide.

Examples of the multifunctional monomer include: monomers having two polymerizable groups such as ethylene glycol di(meth)acrylate, polyethylene glycol di(meth) acrylate, polypropylene glycol di(meth)acrylate, neopentyl glycol di(meth)acrylate, tripropylene glycol di(meth)acrylate, di(meth)acrylate of alkylene oxide adduct of bisphenol A, tetraethylene glycol di(meth)acrylate, hydroxypivalic acid neopentyl glycol di(meth)acrylate, 1,4-butanediol di(meth)acrylate, 1,6-hexanediol di(meth)acrylate, 1,9-nonanediol di(meth)acrylate, 1,12-dodecanediol di(meth) acrylate, 1,14-tetradecanediol di(meth)acrylate, 1,16-hexadecanediol di(meth)acrylate, 1,20-eicosanediol di(meth) acrylate, isopentyldiol di(meth)acrylate, 3-ethyl-1,8-octanediol di(meth)acrylate, and EO adduct of bisphenol A di(meth)acrylate; and monomers having three or more polymerizable groups such as trimethylolpropane tri(meth)

acrylate, trimethyloloctane tri(meth)acrylate, trimethylolpropane polyethoxy tri(meth)acrylate, trimethylolpropane polypropoxy tri(meth)acrylate, trimethylolpropane polyethoxy polypropoxy tri(meth)acrylate, tris[(meth)acryloyloxyethyl]isocyanurate, pentaerythritol tri(meth)acrylate, pentaerythritol polyethoxy tetra(meth)acrylate, pentaerythritol polypropoxy tetra(meth)acrylate, pentaerythritol tetra(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, and caprolactone-modified tris[(meth)acryloyloxyethyl] isocyanurate.

From the viewpoint of increasing the Young's modulus of the resin layer, the monomer preferably includes a multifunctional monomer, and more preferably includes a monomer having two polymerizable groups.

The photopolymerization initiator can be appropriately selected from known radical photopolymerization initiators and used. Examples of the photopolymerization initiator include 1-hydroxycyclohexyl phenyl ketone (Omnirad 184, manufactured by IGM Resins), 2,2-dimethoxy-2-phenylacetophenone, 1-(4-isopropylphenyl)-2-hydroxy-2-methylpropan-1-one, bis(2,6-dimethoxybenzoyl)-2,4,4-trimethylpentylphosphine oxide, 2-methyl-1-[4-(methylthio)phenyl]-2-morpholino-propan-1-one (Omnirad 907 manufactured by IGM Resins), 2,4,6-trimethylbenzoyldiphenylphosphine oxide (Omnirad TPO manufactured by IGM Resins), and bis(2,4,6-trimethylbenzoyl) phenylphosphine oxide (Omnirad 819, manufactured by IGM Resins).

From the viewpoint of suppressing the heat of reaction of the resin composition, the content of the photopolymerization initiator is preferably 0.2% by mass or more and 6.0% by mass or less, more preferably 0.4% by mass or more and 3.0% by mass or less, and further preferably 0.6% by mass or more and 2.0% by mass or less based on the total amount of the oligomer and the monomer.

The resin composition may further contain a silane coupling agent, a leveling agent, an antifoaming agent, an antioxidant, a sensitizer, or the like.

The silane coupling agent is not particularly limited as long as it does not disturb curing of the resin composition. Examples of the silane coupling agent include tetramethyl silicate, tetraethyl silicate, mercaptopropyl trimethoxysilane, vinyltrichlorosilane, vinyltriethoxysilane, vinyltris(β-methoxy-ethoxy)silane, β-(3,4-epoxycyclohexyl)-ethyltrimethoxysilane, dimethoxydimethylsilane, diethoxydimethylsilane, 3-acryloxypropyltrimethoxysilane, γ-glycidoxypropyltrimethoxysilane, γ-glycidoxypropylmethyldiethoxysilane, γ-methacryloxypropyltrimethoxysilane, N-(β-aminoethyl)-γ-aminopropyltrimethoxysilane, N-(β-aminoethyl)-γ-aminopropyltrimethyldimethoxysilane, N-phenyl-γ-aminopropyltrimethoxysilane, γ-chloropropyltrimethoxysilane, γ-mercaptopropyltrimethoxysilane, γ-aminopropyltrimethoxysilane, bis-[3-(triethoxysilyl)propyl]tetrasulfide, bis-[3-(triethoxysilyl)propyl]disulfide, γ-trimethoxysilylpropyldimethylthiocarbamyl tetrasulfide, and γ-trimethoxysilylpropyl benzothiazyl tetrasulfide.

(Inorganic Oxide Particles)

The inorganic oxide particles according to the present embodiment have a surface subjected to hydrophobic treatment. The hydrophobic treatment according to the present embodiment is introduction of a hydrophobic group onto the surface of the inorganic oxide particles. The inorganic oxide particles having a hydrophobic group introduced have excellent dispersion properties in the resin composition. The hydrophobic group may be a reactive group such as a (meth)acryloyl group or a vinyl group, or a non-reactive group such as an aliphatic hydrocarbon group (for example, an alkyl group) or an aromatic hydrocarbon group (for example, a phenyl group). In the case of the inorganic oxide particles having a reactive group, the resin layer having high Young's modulus is easy to form.

The inorganic oxide particles according to the present embodiment are dispersed in a dispersion medium. Using the inorganic oxide particles dispersed in the dispersion medium allows for uniform dispersion of the inorganic oxide particles in the resin composition and then improvement of the storage stability of the resin composition. The dispersion medium is not particularly limited as long as curing of the resin composition is not obstructed. The dispersion medium may be reactive or non-reactive.

A monomer such as a (meth)acryloyl compound and an epoxy compound can be used as the reactive dispersion medium. Examples of the (meth)acryloyl compound include 1,6-hexanediol di(meth)acrylate, EO-modified bisphenol A di(meth)acrylate, polyethylene glycol di(meth)acrylate, PO-modified bisphenol A di(meth)acrylate, polypropylene glycol di(meth)acrylate, and polytetramethylene glycol di(meth)acrylate. Compounds exemplified by monomers described above may be used as the (meth)acryloyl compound.

A ketone solvent such as methyl ethyl ketone (MEK), an alcohol solvent such as methanol (MeOH), or an ester solvent such as propylene glycol monomethyl ether acetate (PGMEA) may be used as a non-reactive dispersion medium. In the case of the non-reactive dispersion medium, the resin composition may be prepared by mixing the base resin and the inorganic oxide particles dispersed in the dispersion medium and removing a part of the dispersion medium. When the dispersion medium comprising the inorganic oxide particles is observed with an optical microscope (about 100 times magnification) and particles are not observed, the inorganic oxide particles are regarded to be dispersed as the primary particles.

The inorganic oxide particles dispersed in the dispersion medium remain to be dispersed in the resin layer after curing of the resin composition. When a reactive dispersion medium is used, the inorganic oxide particles are mixed with the dispersion medium in the resin composition and are incorporated in the resin layer with the dispersion condition maintained. When a non-reactive dispersion medium is used, at least a part of the dispersion medium evaporates and disappears from the resin composition, but the inorganic oxide particles remain in the resin composition with the dispersion condition remained and are also present in the cured resin layer with the dispersion condition remained. Electron microscope observation shows that the inorganic oxide particles present in the resin layer are in the condition of dispersion of the primary particle.

Due to excellent dispersion properties in the resin composition and easy formation of a tough resin layer, it is preferable that the inorganic oxide particles are at least one selected from the group consisting of silicon dioxide (silica), zirconium dioxide (zirconia), aluminum oxide (alumina), magnesium oxide (magnesia), titanium oxide (titania), tin oxide, and zinc oxide. From the viewpoint of excellent inexpensiveness, easy surface treatment, permeability to ultraviolet ray, easy provision of a resin layer with appropriate hardness, and the like, it is more preferable that the hydrophobic silica particles be used as the inorganic oxide particles according to the present embodiment.

From the viewpoint of imparting appropriate toughness to the secondary resin layer, the average primary particle size of the inorganic oxide particles may be 500 nm or less, is preferably 200 nm or less, more preferably 100 nm or less, and further preferably 50 nm or less. From the viewpoint of increasing the Young's modulus of the secondary resin layer, the average primary particle size of the inorganic oxide particles is preferably 5 nm or more, and more preferably 10 nm or more. The average primary particle diameter can be measured with image analysis of electron microscope pictures, a light scattering method or a BET method, for example. The dispersion medium in which the primary particle of the inorganic oxide is dispersed appears to be visually transparent when the diameter of the primary particle is small. When the diameter of the primary particle diameter is relatively large (40 nm or more), the dispersion medium in which the primary particle is dispersed appears to be clouded, but the precipitate is not observed.

The content of the inorganic oxide particles is preferably 1% by mass or more and 60% by mass or less, more preferably 5% by mass or more and 55% by mass or less, and further preferably 10% by mass or more and 50% by mass or less based on the total amount of the oligomer, the monomer, and the inorganic oxide particles. The content of the inorganic oxide particles of 1% by mass or more allows easy increase in the Young's modulus of the resin layer. The content of the inorganic oxide particles of 60% by mass or less allows easy reduction of the heat of reaction of the resin composition.

From the viewpoint of suppressing the generation of voids in producing an optical fiber with increasing the linear speed, the amount of the heat of reaction when the resin composition according to the present embodiment is irradiated with ultraviolet rays at an intensity of 30 mW/cm$^2$ for 300 seconds is preferably 100 J/g or more and 275 J/g or less, more preferably 110 J/g or more and 265 J/g or less, and further preferably 120 J/g or more and 260 J/g or less. The amount of the heat of reaction of the resin composition can be measured by using a differential scanning calorimeter equipped with an ultraviolet irradiation device (UV-DSC).

The resin composition according to the present embodiment is preferably used as the secondary coating material for the optical fiber. Using the resin composition according to the present embodiment for the secondary resin layer can suppress the generation of voids in producing an optical fiber with increasing the linear speed and produce an optical fiber having excellent lateral pressure characteristics.

<Optical Fiber>

FIG. 1 is a schematic cross-section diagram showing an example of the optical fiber according to the present embodiment. The optical fiber 10 comprises the glass fiber 13 including the core 11 and the cladding 12, and the coating resin layer 16 including the primary resin layer 14 provided on the outer periphery of the glass fiber 13 and the secondary resin layer 15.

The cladding 12 surrounds the core 11. The core 11 and the cladding 12 mainly include glass such as silica glass, germanium-added silica glass or pure silica glass can be used, for example, in the core 11, and pure silica glass or fluorine-added silica glass can be used in the cladding 12.

In FIG. 1, for example, the outside diameter (D2) of the glass fiber 13 is about 100 μm to 125 μm, and the diameter (D1) of the core 11 constituting the glass fiber 13 is about 7 μm to 15 μm. The thickness of the coating resin layer 16 is typically about 22 μm to 70 μm. The thickness of each of the primary resin layer 14 and the secondary resin layer 15 may be about 5 μm to 50 μm.

When the outside diameter (D2) of the glass fiber 13 is about 125 μm and the thickness of the coating resin layer 16 is 60 μm or more and 70 μm or less, the thickness of each of the primary resin layer 14 and the secondary resin layer 15 may be about 10 μm to 50 μm, and for example, the thickness of the primary resin layer 14 may be 35 μm and the thickness of the secondary resin layer 15 may be 25 μm. The outside diameter of the optical fiber 10 may be about 245 μm to 265 μm.

When the outside diameter (D2) of the glass fiber 13 is about 125 μm and the thickness of the coating resin layer 16 is 27 μm or more and 48 μm or less, the thickness of each of the primary resin layer 14 and the secondary resin layer 15 may be about 10 μm to 38 μm, and for example, the thickness of the primary resin layer 14 may be 25 μm and the thickness of the secondary resin layer 15 may be 10 μm. The outside diameter of the optical fiber 10 may be about 179 μm to 221 μm.

When the outside diameter (D2) of the glass fiber 13 is about 100 μm and the thickness of the coating resin layer 16 is 22 μm or more and 37 μm or less, the thickness of each of the primary resin layer 14 and the secondary resin layer 15 may be about 5 μm to 32 μm, and for example, the thickness of the primary resin layer 14 may be 25 μm and the thickness of the secondary resin layer 15 may be 10 μm. The outside diameter of the optical fiber 10 may be about 144 μm to 174 μm.

Applying the resin composition according to the present embodiment to the secondary resin layer can produce an optical fiber having a high Young's modulus and excellent lateral pressure characteristics.

A method for manufacturing the optical fiber according to the present embodiment comprises: an application step of applying the above resin composition to the outer periphery of a glass fiber composed of a core and a cladding; and a curing step of curing the resin composition by irradiating with ultraviolet rays after the application step.

The Young's modulus of the secondary resin layer is preferably 1200 MPa or more and 3500 MPa or less at 23° C., more preferably 1200 MPa or more and 3300 MPa or less, and further preferably 1300 MPa or more and 3000 MPa or less. The Young's modulus of the secondary resin layer of 1200 MPa or more is easy to improve the lateral pressure characteristics, and the Young's modulus of 3500 MPa or less can provide proper toughness to the secondary resin layer, and thus can be hard to occur a crack or the like in the secondary resin layer.

The primary resin layer 14 can be formed by curing a resin composition including a urethane (meth)acrylate oligomer, a monomer, a photopolymerization initiator and a silane coupling agent. Prior art techniques can be used for a resin composition for the primary resin layer. A urethane (meth)acrylate oligomer, a monomer, a photopolymerization initiator and a silane coupling agent may be appropriately selected from compounds exemplified in the above base resin. The resin composition constituting the primary resin layer has composition different from the base resin forming the secondary resin layer.

From the viewpoint of suppressing the generation of voids in the optical fiber, the Young's modulus of the primary resin layer is preferably 0.04 MPa or more and 1.0 MPa or less at 23° C., more preferably 0.05 MPa or more and 0.9 MPa or less, and further preferably 0.05 MPa or more and 0.8 MPa or less.

The linear speed in producing the optical fiber may be 500 m/min or more. From the viewpoint of increasing the production efficiency of the optical fiber, the linear speed is preferably 1000 m/min or more, more preferably 1500 m/min or more, and further preferably 2000 m/min or more.

EXAMPLES

Hereinafter, the results of evaluation test using Examples and Comparative Examples according to the present disclosure will be shown, and the present disclosure is described in more detail. The present invention is not limited to these examples.

[Resin Composition for a Secondary Resin Layer]

(Oligomer)

As the oligomer, a urethane acrylate oligomer (UA) obtained by reacting a polypropylene glycol having a molecular weight of 600, 2,4-tolylene diisocyanate, and hydroxyethyl acrylate, and an epoxy acrylate oligomer (EA) were prepared.

(Monomer)

As the monomer, tripropylene glycol diacrylate (TPGDA) (trade name "Viscoat 310HP" of Osaka Organic Chemical Industry Ltd.) was prepared.

(Photopolymerization Initiator)

As the photopolymerization initiator, 1-hydroxycyclohexyl phenyl ketone (Omnirad 184) and 2,4,6-trimethylbenzoyldiphenylphosphine oxide (Omnirad TPO) were prepared.

(Inorganic Oxide Particles)

Silica sol having hydrophobic silica particles having a methacryloyl group and with an average primary particle size of 10 to 15 nm, dispersed in MEK was prepared as the inorganic oxide particles.

(Resin Composition)

First, a base resin was prepared by mixing the above oligomer, monomer, and photopolymerization initiator. Next, the silica sol was mixed with the base resin so as to have the content of the silica particles shown in Table 1 or Table 2, and then most of MEK as a dispersion medium was removed under reduced pressure to produce resin compositions for the secondary resin layer of Examples and Comparative Examples. The content of remaining MEK in the resin composition was 5% by mass or less.

In Table 1 and Table 2, the values of the oligomer, the monomer, and the photopolymerization initiator are the contents based on the total amount of the oligomer and the monomer, and the values of the silica particles are the contents based on the total amount of the monomer, the oligomer, and the silica particles.

(Heat of Reaction)

The heat of reaction of the resin composition for the secondary resin layer was measured by UV-DSC. The measurement was performed under the following conditions by putting about 3 mg of the resin composition in a ϕ5 mm aluminum container.

Differential scanning calorimetry: Q100 (manufactured by TA Instruments)
Data processing: Universal Analysis 2000 (manufactured by TA Instruments)
Atmosphere: Nitrogen (50 mL/min)
Temperature: 25° C.
Ultraviolet irradiation device: OmniCure S2000 (manufactured by U-VIX Corporation)
Light source: High-pressure mercury lamp (all wavelengths)
Irradiation intensity: 30 mW/cm$^2$
Irradiation time: 300 seconds (light irradiation started 1 minute after the start of measurement)

[Production of an Optical Fiber]

A urethane acrylate oligomer obtained by reacting polypropylene glycol with a molecular weight of 4000, isophorone diisocyanate, hydroxyethyl acrylate, and methanol was prepared. 75 parts by mass of this urethane acrylate oligomer, 12 parts by mass of a nonylphenol EO-modified acrylate, 6 parts by mass of N-vinylcaprolactam, 2 parts by mass of 1,6-hexanediol diacrylate, 1 part by mass of 2,4,6-trimethylbenzoyldiphenylphosphine oxide, and 1 part by mass of 3-mercaptopropyltrimethoxysilane were mixed to obtain a resin composition for the primary resin layer.

The resin composition for the primary resin layer and the resin composition of Examples or Comparative Examples for the secondary resin layer were applied to the outer periphery of a 125 μm diameter glass fiber composed of a core and a cladding, and then the resin composition was cured by irradiating with ultraviolet rays and a primary resin layer with a thickness of 35 μm and a secondary resin layer with a thickness of 25 μm around the outer periphery thereof were formed to produce an optical fiber. The optical fibers were produced by changing the linear speed to 500 m/min, 1000 m/min, and 2000 m/min, respectively.

(Application Property)

For the optical fiber produced by changing the linear speed, the application properties of the resin composition were evaluated by confirming the presence or absence of a disconnection and the presence or absence of cracking of the resin layer. The case where there was no disconnection and no crack in the resin layer was evaluated as "A", the case where there was a disconnection and there was no crack in the resin layer was evaluated as "B", and the case where there was a disconnection and a crack occurred in the resin layer was evaluated as "C".

The following evaluation was performed by using the optical fiber produced at a linear speed of 2000 m/min.

(Young's Modulus of the Primary Resin Layer)

The Young's modulus of the primary resin layer was measured by the Pullout Modulus (POM) method at 23° C. Two parts of an optical fiber were fixed with two chuck devices, a coating resin layer (the primary resin layer and the secondary resin layer) between the two chuck devices was removed, and then one chuck device was fixed and another chuck device was slowly moved in the opposite direction of the fixed device. When the length of the portion sandwiched between the chuck devices to be moved in the optical fiber is L, the amount of movement of the chuck is Z, the outer diameter of the primary resin layer is Dp, the outer diameter of the glass fiber is Df, the Poisson's ratio of the primary resin layer is n, and the load in moving the chuck device is W, the Young's modulus of the primary resin layer was determined from the following formula. The Young's modulus of the primary resin layer was 0.2 MPa.

$$\text{Young's modulus (MPa)} = ((1+n)W/\pi LZ) \times \ln(Dp/Df)$$

(Young's Modulus of the Secondary Resin Layer)

The Young's modulus of the secondary resin layer was determined from 2.5% secant value by using a pipe-shaped coating resin layer (length: 50 mm or more) obtained by taking out a glass fiber from an optical fiber to perform a tensile test (distance between marked lines: 25 mm) in an environment of 23±2° C. and 50±10% RH.

(Generation of Void)

An optical fiber of 10 m was stored at 85° C. and 85% humidity for 120 days and then left at −40° C. for 16 hours, and the presence or absence of voids with a diameter of 10 μm or more was observed with a microscope. The case where the number of voids per 1 m of the optical fiber was less than 1 was evaluated as "A", the case where the number of voids was 1 to 2 was evaluated as "B", and the case where the number of voids exceeded 2 was evaluated as "C".

(Lateral Pressure Characteristics)

The transmission loss of light having a wavelength of 1550 nm when the optical fiber was wound into a single layer onto a bobbin with its surface covered with sandpaper and having a diameter of 280 mm was measured by an OTDR (Optical Time Domain Reflectometer) method. In addition, the transmission loss of light having a wavelength of 1550 nm when the optical fiber was wound into a single layer on a bobbin having a diameter of 280 mm without sandpaper was measured by the OTDR method. Difference in the measured transmission loss was obtained and the lateral pressure characteristics was evaluated as "A" when the transmission loss difference was 0.6 dB/km or less, and the lateral pressure characteristics was evaluated as "B" when the transmission loss difference was over 0.6 dB/km.

TABLE 1

| Example | 1 | 2 | 3 | 4 | 5 | 6 | 7 | 8 | 9 | 10 |
|---|---|---|---|---|---|---|---|---|---|---|
| Silica particles (% by mass) | 30 | 30 | 30 | 5 | 30 | 40 | 50 | 30 | 40 | 40 |
| UA (% by mass) | 50 | 50 | 50 | 50 | 50 | 50 | 50 | 25 | 20 | 15 |
| EA (% by mass) | 15 | 15 | 15 | 15 | 15 | 15 | 15 | 35 | 40 | 60 |
| UA/EA | 3.33 | 3.33 | 3.33 | 3.33 | 3.33 | 3.33 | 3.33 | 0.71 | 0.50 | 0.25 |
| TPGDA (% by mass) | 35 | 35 | 35 | 35 | 35 | 35 | 35 | 40 | 40 | 20 |
| Omnirad 184 (% by mass) | 0.5 | 0.5 | 0.5 | 0.5 | 0.5 | 0.5 | 0.5 | 0.5 | 0.5 | 0.5 |
| Omnirad TPO (% by mass) | 0.2 | 0.3 | 5.0 | 0.5 | 0.5 | 0.5 | 0.5 | 0.5 | 0.5 | 0.5 |
| Amount of heat of reaction (J/g) | 170 | 180 | 250 | 240 | 190 | 160 | 130 | 250 | 240 | 270 |
| Young's modulus (MPa) | 1900 | 1900 | 2000 | 1200 | 1900 | 2300 | 2500 | 2600 | 2800 | 3000 |
| Generation of void | A | A | A | A | A | A | A | A | A | A |
| Lateral pressure characteristics | A | A | A | A | A | A | A | A | A | A |
| Linear speed 500 (m/min) | A | A | A | A | A | A | A | A | A | A |
| 1000 | A | A | A | A | A | A | A | A | A | A |
| 2000 | A | A | A | A | A | A | A | A | A | A |

TABLE 2

| Comparative Example | 1 | 2 | 3 | 4 | 5 |
|---|---|---|---|---|---|
| Silica particles (% by mass) | — | — | — | — | — |
| UA (% by mass) | 50 | 40 | 35 | 25 | 12 |
| EA (% by mass) | 15 | 15 | 20 | 35 | 60 |
| UA/EA | 3.33 | 2.67 | 1.75 | 0.71 | 0.20 |
| TPGDA (% by mass) | 35 | 45 | 45 | 40 | 28 |
| Omnirad 184 (% by mass) | 0.5 | 0.5 | 0.5 | 0.5 | 0.5 |
| Omnirad TPO (% by mass) | 0.5 | 0.5 | 0.5 | 0.5 | 0.5 |
| Amount of heat of reaction (J/g) | 280 | 290 | 320 | 360 | 380 |
| Young's modulus (MPa) | 1100 | 1200 | 1300 | 1800 | 2000 |
| Generation of void | B | C | C | C | C |
| Lateral pressure characteristics | B | A | A | A | A |
| Linear speed 500 (m/min) | A | A | B | C | C |
| 1000 | A | B | B | C | C |
| 2000 | A | C | C | C | C |

It can be confirmed from Tables 1 and 2 that the resin composition comprising hydrophobic silica particles and having a UA/EA ratio of 0.25 or more has the amount of heat of reaction that is as small as 275 J/g or less and improved application properties of the resin composition, allowing reduction of voids in the optical fiber. The optical fiber having excellent lateral pressure resistance characteristics can be efficiently produced by using the resin composition according to the present disclosure as an ultraviolet curable resin composition for coating the optical fiber.

REFERENCE SIGNS LIST

10: Optical fiber, 11: Core, 12: Cladding, 13: Glass fiber, 14: Primary resin layer, 15: Secondary resin layer, 16: Coating resin layer.

The invention claimed is:

1. A resin composition for coating an optical fiber, the resin composition comprising:
   a base resin containing an oligomer, a monomer, and a photopolymerization initiator; and
   hydrophobic inorganic oxide particles,
   wherein the oligomer comprises urethane (meth)acrylate and epoxy (meth)acrylate, and a mass ratio of a content of the urethane (meth)acrylate to a content of the epoxy (meth)acrylate is 0.25 or more, and
   wherein an amount of heat of reaction when the resin composition is irradiated with ultraviolet rays at an irradiation intensity of 30 mW/cm$^2$ for 300 seconds is 100 J/g or more and 275 J/g or less.

2. The resin composition according to claim 1, wherein the monomer comprises a multifunctional monomer having two or more polymerizable groups.

3. The resin composition according to claim 1, wherein the inorganic oxide particles are at least one selected from the group consisting of silicon dioxide, zirconium dioxide, aluminum oxide, magnesium oxide, titanium oxide, tin oxide, and zinc oxide.

4. The resin composition according to claim 1, wherein a content of the inorganic oxide particles is 1% by mass or more and 60% by mass or less based on a total amount of the oligomer, the monomer, and the inorganic oxide particles.

5. An optical fiber comprising:
   a glass fiber comprising a core and a cladding;
   a primary resin layer being in contact with the glass fiber and covering the glass fiber; and
   a secondary resin layer covering the primary resin layer,
   wherein the secondary resin layer comprises a cured product of the resin composition according to claim 1.

6. The optical fiber according to claim 5, wherein a Young's modulus of the secondary resin layer is 1200 MPa or more and 3500 MPa or less at 23° C.

7. A method for manufacturing an optical fiber, comprising:
   an application step of applying the resin composition according to claim 1 to an outer periphery of a glass fiber composed of a core and a cladding; and
   a curing step of curing the resin composition by irradiating with ultraviolet rays after the application step.

* * * * *